United States Patent
Coxe, Jr. et al.

(10) Patent No.: US 9,176,564 B2
(45) Date of Patent: Nov. 3, 2015

(54) SYSTEMS AND METHODS FOR THERMAL CONTROL OF A STORAGE ENCLOSURE

(71) Applicant: Dell Products L.P., Round Rock, TX (US)

(72) Inventors: William K. Coxe, Jr., Round Rock, TX (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 14/132,196

(22) Filed: Dec. 18, 2013

(65) Prior Publication Data
US 2015/0169030 A1    Jun. 18, 2015

(51) Int. Cl.
*G06F 1/32* (2006.01)

(52) U.S. Cl.
CPC ............ *G06F 1/3225* (2013.01); *G06F 1/3287* (2013.01)

(58) Field of Classification Search
CPC ... G06F 1/3202; G06F 1/3289; G06F 1/3228; G06F 1/3231; G06F 1/26
USPC .................. 713/300, 310, 320, 322, 323, 324
See application file for complete search history.

(56) References Cited

U.S. PATENT DOCUMENTS

| | | | |
|---|---|---|---|
| 2007/0089446 A1* | 4/2007 | Larson et al. | 62/259.2 |
| 2010/0076607 A1* | 3/2010 | Ahmed et al. | 700/276 |
| 2010/0250973 A1* | 9/2010 | Breen et al. | 713/300 |
| 2012/0290135 A1* | 11/2012 | Bentivegna et al. | 700/276 |
| 2013/0006427 A1* | 1/2013 | Hall et al. | 700/282 |
| 2013/0073096 A1* | 3/2013 | Brey et al. | 700/282 |
| 2013/0133350 A1* | 5/2013 | Reytblat | 62/259.2 |
| 2014/0108831 A1* | 4/2014 | Dube et al. | 713/320 |

* cited by examiner

*Primary Examiner* — Zahid Choudhury
(74) *Attorney, Agent, or Firm* — Jackson Walker L.L.P.

(57) ABSTRACT

In accordance with these and other embodiments of the present disclosure, a controller for thermal control of an enclosure comprising one or more storage resources may be configured to receive an indication of a physical quantity indicative of a power delivered from at least one power supply module to information handling resources of the enclosure. The controller may also be configured to, based on the physical quantity indicative of the power delivered from the at least one power supply module, determine a desired rate of the flow of air from at least one air mover configured to cool one or more storage resources received by the enclosure by delivering a flow of air within the storage enclosure and cause the at least one air mover to deliver the flow of air in accordance with the desired rate.

10 Claims, 2 Drawing Sheets

SYSTEMS AND METHODS FOR THERMAL CONTROL OF A STORAGE ENCLOSURE

TECHNICAL FIELD

The present disclosure relates in general to information handling systems, and more particularly controlling the speed of one or more air movers (e.g., one or more fans and/or blowers) associated with a storage enclosure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual resource."

Implementations of storage resource arrays can range from a few storage resources disposed in a server chassis, to hundreds of storage resources disposed in one or more separate storage enclosures. As densities of storage resources making up storage arrays have increased, so has the power required for the storage resources making up such arrays, as well as the heat generated by the storage resources. Often, the temperatures of these storage resources need to be kept within a reasonable range to prevent overheating, instability, malfunction and damage leading to a shortened component lifespan. Accordingly, air movers (e.g., cooling fans and/or blowers) have often been used in storage enclosures to cool storage resources and other components within storage enclosures.

However, many existing approaches for thermal control in storage enclosures are energy-inefficient as compared to thermal control approaches used in information handling system servers. This occurs as a result of the fact that many storage enclosures have very limited processing power vis-à-vis that of servers. Storage enclosures may employ small, limited-purpose processors which are often built into or embedded into switching devices for routing traffic between information handling hosts and individual storage resources. Because of these limited processing capabilities, air mover control algorithms in storage enclosures may be more primitive than those in information handling system servers. Oftentimes, storage enclosures employ open-loop air mover control, meaning that air mover speed is set based on an ambient temperature of the environment proximate to or within the storage enclosure or based on a thermal sensor associated with a controller and/or switch for controlling routing of traffic in the storage enclosure. Thus, air mover speed is not set based on an actual thermal condition of the storage resources nor based on an actual power consumed or thermally dissipated by the storage resources.

Storage resources that may be used in a storage enclosure may have varying parameters (e.g., capacities, sizes, rotational speeds, etc.), meaning that various storage resources may consume vastly different amounts of power, sometimes varying by a factor of two or more. A designer of a thermal control system comprising one or more air movers may not be aware of the type of storage resources that may be placed within a storage enclosure, and thus must assume a "worst-case" scenario in implementing the thermal control system. Thus, as a temperature in or around a storage enclosure increases, it may be assumed that the thermal control system must cool the highest-power-consuming storage resources, and thus air mover speeds may be increased to meet the needs of the worst-case storage resource despite the fact that the storage enclosure may employ lower-power-consuming storage resources. The result may be storage enclosures that consume more air mover power than needed to achieve effective thermal control, generate more acoustic noise than if a more-power efficient approach were used, and/or that cost more to operate.

Accordingly, systems and methods may be desired allowing a storage controller to operate with open loop thermal control, while using thermal control approaches that are more closely tailored to the storage resources actually used by the system.

SUMMARY

In accordance with the teachings of the present disclosure, the disadvantages and problems associated with traditional approaches to thermal control of components of a storage controller may be substantially reduced or eliminated.

In accordance with embodiments of the present disclosure, a storage enclosure may be configured to receive at least one storage resource and may include at least one air mover, at least one power supply module, at least one power monitor, and at least one controller. The at least one air mover may be configured to cool one or more storage resources received by the storage enclosure by delivering a flow of air within the storage enclosure. The at least one power supply module may be configured to generate and deliver electrical energy to information handling resources of the storage enclosure including the at least one storage resource. The at least one power monitor may be configured to measure a physical quantity indicative of the power delivered from the at least one power supply module. The at least one controller may be configured to, based on the physical quantity indicative of the power delivered from the at least one power supply module, determine a desired rate of the flow of air from the at least one air mover, and cause the at least one air mover to deliver the flow of air in accordance with the desired rate.

In accordance with these and other embodiments of the present disclosure, a method may include receiving an indication of a physical quantity indicative of a power delivered from at least one power supply module to information handling resources of a storage enclosure including one or more storage resources. The method may also include, based on the physical quantity indicative of the power delivered from the at least one power supply module, determining a desired rate of the flow of air from at least one air mover configured to cool one or more storage resources received by the storage enclosure by delivering a flow of air within the storage enclosure and causing the at least one air mover to deliver the flow of air in accordance with the desired rate.

In accordance with these and other embodiments of the present disclosure, a controller for thermal control of an enclosure comprising one or more storage resources may be configured to receive an indication of a physical quantity indicative of a power delivered from at least one power supply module to information handling resources of the enclosure. The controller may also be configured to, based on the physical quantity indicative of the power delivered from the at least one power supply module, determine a desired rate of the flow of air from at least one air mover configured to cool one or more storage resources received by the enclosure by delivering a flow of air within the storage enclosure and cause the at least one air mover to deliver the flow of air in accordance with the desired rate.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
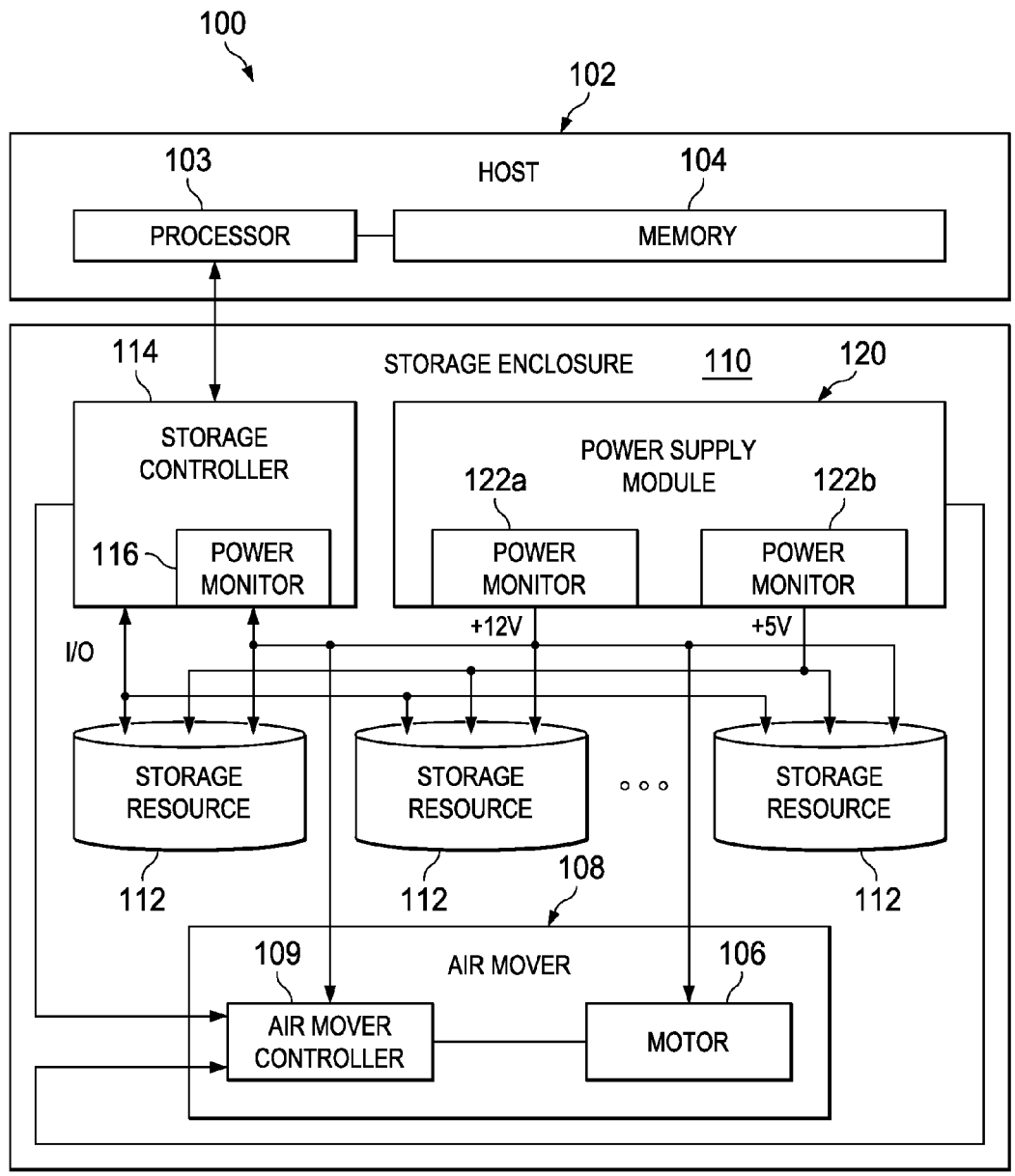
FIG. 1 illustrates a block diagram of an example system for data storage including a storage enclosure, in accordance with embodiments of the present disclosure.
Figure 2:
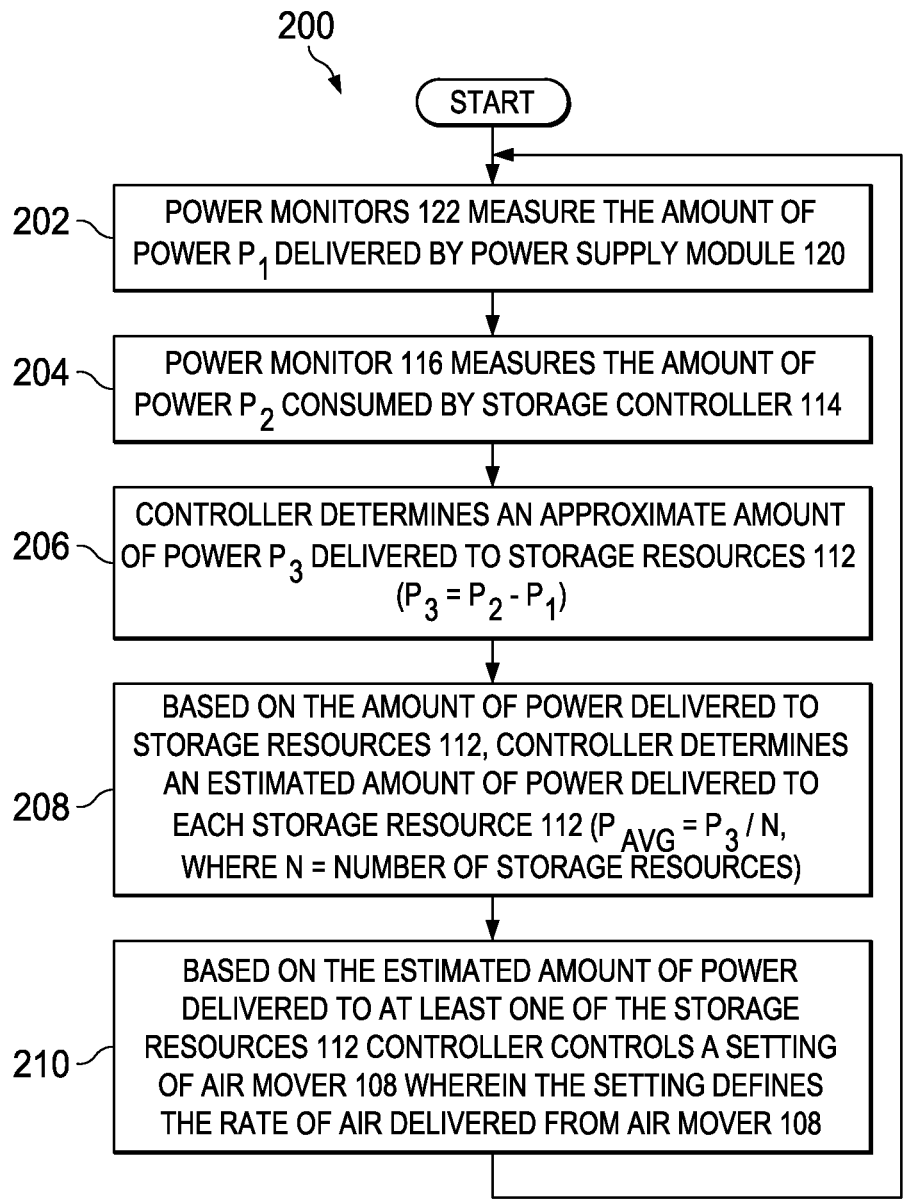
FIG. 2 illustrates a flow chart of an example method for thermal control in a storage enclosure, in accordance with embodiments of the present disclosure.

Preferred embodiments and their advantages are best understood by reference to FIGS. 1 and 2 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In this disclosure, the term "information handling resource" may broadly refer to any component system, device or apparatus of an information handling system, including without limitation processors, busses, memories, input-output devices and/or interfaces, storage resources, network interfaces, motherboards, electro-mechanical devices (e.g., air movers), displays, and power supplies.

FIG. 1 illustrates a block diagram of an example system 100 for data storage including a storage enclosure 110, in accordance with an embodiment of the present disclosure. As depicted, system 100 may include a host 102 and a storage enclosure 110. Host 102 may comprise an information handling system and may generally be operable to read data from and/or write data to one or more storage resources 112 disposed in storage enclosure 110. In certain embodiments, host 102 may be a server. Although system 100 is depicted as having one host 102, it is understood that system 100 may include any number of hosts 102.

As shown in FIG. 1, host 102 may include a processor 103 and a memory 104 communicatively coupled to processor 103.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of host 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to host 102 is turned off.

As depicted in FIG. 1, storage enclosure 110 may be configured to hold and power one or more storage resources 112. Storage enclosure 110 may be communicatively coupled to host 102 in any suitable manner (e.g., cable, communication network, etc.) to facilitate communication of media between host 102 and storage resources 112. Storage resources 112 may include hard disk drives, magnetic tape libraries, optical disk drives, magneto-optical disk drives, compact disk drives, compact disk arrays, disk array controllers, other computer-readable media, and/or any other system, apparatus or device operable to store media.

In addition to storage resources 112, storage enclosure 110 may include a storage controller 114, a power supply module 120, and an air mover 108. Storage controller 114 (which may also be referred to as an enclosure management module or EMM) may be communicatively coupled to host 102 and storage enclosures 112. Storage controller 114 may be configured to issue commands and/or other signals to manage and/or control storage resources 112, power supply module 120, and/or air mover 108. Storage controller 114 may also be configured to route data from host 102 to one or more destination storage resources 112 and/or from one or more source storage resources 112 to host 102. In some embodiments, storage controller 114 may comprise a microprocessor, microcontroller, digital signal processor (DSP), application specific integrated circuit (ASIC), or any other digital or analog circuitry configured to interpret and/or execute program instructions and/or process data. In these and other embodiments, storage controller 114 may comprise a switch for routing I/O communications between host 102 and storage resources 112.

As shown in FIG. 1, storage controller 114 may comprise a power monitor 116. Power monitor 116 may comprise any system, device, or apparatus configured to measure an amount of power delivered to storage controller 114 by power supply module 120, or, in the alternative, measure a physical quantity (e.g., current) indicative of the amount of power delivered to storage controller 114 by power supply module 120. For example, in some embodiments, power monitor 116 may comprise an electrical current sensing device for measuring a current delivered from power supply module 120 to storage controller 114. Such current sensing devices may be commonly present on storage controllers 114, particularly within hot-pluggable storage controllers, in order to ensure that electrical energy is not delivered to such a storage controller 114 before it is appropriately seated in a corresponding connector and to act as a failsafe in the event that the storage controller 114 consumes excess power. In addition or alternatively, such current sensing devices may be commonly present on storage controllers 114 and other components of storage enclosure 110, for power capping applications to limit power consumption, for example, when available power from power supply module 120 is reduced to a failure of power supply module 120 or a loss of redundancy in power supply modules 120.

Power supply module 120 may include any device, system, or apparatus operable to supply electrical energy to storage controller 114, storage resources 112, and/or other components of storage enclosure 110. Power supply module 120 may be configured to supply one or more operating voltages to components of storage enclosure 110. For example, as shown, power supply module 120 may supply operating voltages of 12 volts and 5 volts to storage resources 112, wherein storage resources 112 may utilize the 5-volt supply for logic circuits and the 12-volt supply for operation of electromechanical components (e.g. motors). As another example, also as shown, power supply module 120 may supply an operating voltage of 12 volts to storage controller 114 and/or air mover 108. Power supply module 120 may also supply one or more operating voltages (e.g., 5 volts and/or 12 volts) to other information handling resources of storage enclosure 110 depending on the voltage and power requirements of such information handling resources.

As shown in FIG. 1, power supply module 120 may comprise one or more power monitors 122 (e.g., power monitors 122a and 122b). In some embodiments, power supply module 120 may include a power monitor 122 for each supply voltage it supplies to information handling resources of storage enclosure 110. Similar to power monitor 116, a power monitor 122 may comprise any system, device, or apparatus configured to measure an amount of power delivered by power supply module 120 to information handling resources of storage enclosure 110, or, in the alternative, measure a physical quantity (e.g., current) indicative of the amount of power delivered by power supply module 120. For example, in some embodiments, a power monitor 122 may comprise an electrical current sensing device for measuring a current delivered from power supply module. Such current sensing devices may be commonly present within power supply modules 120 in order to detect overcurrent situations, thus allowing for a power supply module to shut down when potentially damaging overcurrent situations arise.

Air mover 108 may be communicatively coupled to storage controller 114 and/or power supply module 120, and may include any mechanical or electro-mechanical system, apparatus, or device operable to move air and/or other gasses. In some embodiments, air mover 108 may comprise a fan (e.g., a rotating arrangement of vanes or blades which act on the air). In other embodiments, air mover 108 may comprise a blower (e.g. centrifugal fan that employs rotating impellers to accelerate air received at its intake and change the direction of the airflow). In these and other embodiments, rotating and other moving components of air mover 108 may be driven by a motor 106. In operation, air mover 108 may cool information handling resources of storage enclosure 110, including storage resources 112, by drawing cool air into storage enclosure 110 from storage controller 114, expel warm air from inside storage controller 114 to the outside of storage controller 114, and/or move air across one or more heatsinks (not explicitly shown) internal to storage controller 114 to cool one or more information handling resources. As shown in FIG. 1, air mover 108 my include an air mover controller 109 and motor 106.

Air mover controller 109 may include any system, device, or apparatus configured to receive one or more input control signals (e.g., from storage controller 114 and/or power supply module 120) and based on such signal, control the speed of motor 106, as is described in greater detail below.

Although the embodiment shown in FIG. 1 depicts storage enclosure 110 having three storage resources 112, storage enclosure 110 may have any number of storage resources 112. Furthermore, although FIG. 1 depicts storage enclosure 110 having a single storage controller 114, single power supply module 120, and single air mover 108, storage controller 114 may have multiple instances of any of such components (e.g., for redundancy, additional throughput, additional cooling capacity, etc.) In addition, although system 100 is depicted as having one storage enclosure 110 and one host 102, system 100 may include any number of storage enclosures 110, hosts 102, or other information handling resources.

In operation, the power monitors 116, 122 may monitor the power consumed and therefore dissipated into storage enclosure 110. Stated another way, as power delivered to an information handling resource of storage enclosure 110, such as a storage resource 112, increases, the heat dissipated into storage enclosure 110 by the information handling resource also increases. Accordingly, a controller (e.g., either of storage controller 114 and air mover controller 109) may, based on the levels of power delivered by power supply module 120 (e.g., as measured by power monitors 122a and 122b), control the amount of air delivered by air mover 108 (e.g., by controlling a speed of motor 106). In such embodiments, control of air mover 108 may also be based on power delivered to specific information handling resources of storage enclosure 110, for example, power delivered to storage controller 114 (e.g., as measured by power monitor 116). To further illustrate, power delivered to storage resources 112 may be estimated by subtracting the power delivered to one or more information handling resources other than the storage resources 112 (e.g., power delivered to storage controller 114) from the overall power delivered by power supply module 120. Furthermore, in some instances it may be assumed that power delivery to all storage resources 112 of storage enclosure 110 may be approximately equal, as would typically be the case in a RAID where data is distributed approximately equally among the various storage resources 112. Thus, once an approximate power delivered to all storage resources 112 is determined, the power delivered to each storage resource 112 may be estimated by dividing such approximate power by the number of storage resources 112 in storage enclosure 110, and delivering air from air mover 108 based on the estimated power delivered to each storage resource 112.

In some instances, power delivery to all storage resources 112 of storage enclosure 110 may not be approximately equal, as is the case of a RAID using hot spare storage resources. In such instances, simply dividing the power delivered by the number of storage resources 112 may not provide an accurate estimate of the power delivered to each storage resource 112. Accordingly, in such an instance, the presence of a hot spare storage resource 112 may be accounted for in calculating estimated power delivered to each storage resource.

FIG. 2 illustrates a flow chart of an example method 200 for thermal control in storage enclosure 110, in accordance with embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, power monitors 122 may measure the amount of power $P_1$ delivered by power supply module 120. At step 204, power monitor 116 may measure the amount of power $P_2$ consumed by storage controller 114. At step 206, a controller (e.g., storage controller 114 or air mover controller 109) may subtract the measured amount of power delivered to storage controller 114 from the measured amount of power delivered by power supply module 120 to determine an approximate amount of power $P_3$ delivered to storage resources 112 (e.g., $P_3=P_2-P_1$). At step 208, the controller may, based on the amount of power delivered to storage resources 112, determine an estimated amount of power delivered to each storage resource 112 (e.g., in some embodiments $P_{AVG}=P_3/N$, where N equals the number of storage resources 112). At step 210, based on the estimated amount of power delivered to at least one of the storage resources 112 (e.g., the storage resource 112 or storage resources 112 receiving the most estimated amount of power), the controller may control a setting of air mover 108 wherein the setting defines the rate of air delivered from air mover 108 (e.g., a speed of motor 106). After completion of step 210, method 200 may proceed again to step 202.

Although FIG. 2 discloses a particular number of steps to be taken with respect to method 200, it is understood that method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

In the foregoing discussion, it is contemplated that "a controller" may determine an estimated amount of power delivered to storage resources 112 and control a setting of air mover 108 for defining a rate of air delivered from air mover 108. In some embodiments, such controller may comprise storage controller 114, in which storage controller 114 may receive signals indicative of the power measurements from power monitor 116 and power monitors 122 and based on such signals, determine an estimated amount of power delivered to storage resources 112 and based thereon, communicate a signal to air mover controller 109 indicative of the air delivery rate setting of air mover 108. In other embodiments, such controller may comprise air mover controller 109, in which air mover controller 109 may receive signals indicative of the power measurements from power monitor 116 and power monitors 122 and based on such signals, determine an estimated amount of power delivered to storage resources 112 and based thereon, communicate a signal to motor 106 for controlling the speed of motor 106.

Because the methods and systems described above may leverage power monitors 116, 122 that may already be present within storage controller 114 and power supply module 120, respectively, such methods and systems may lead to a minimal increase in cost of storage enclosure 110.

Although the foregoing disclosure explicitly depicts embodiments in which power monitors 116, 122 are integral to storage controller 114 and power supply module 120, respectively, in other embodiments of the present disclosure, such power monitors 116, 122 may be present elsewhere in storage enclosure 110. For example, in some embodiments, a power monitor 122 may be inserted in a power bus between power supply module 120 and storage resources 112 in order to determine power delivered to storage resources 112.

In some embodiments, in addition to monitoring, estimating, and/or calculating an amount of power delivered to a storage resource 112, a controller (e.g., storage controller 114) may periodically (e.g., every five minutes) poll or receive a signal from the storage resource 112 indicative of a thermal status (e.g., temperature) of the storage resource. The controller may then populate a table or other data structure correlating power delivered to a storage resource 112 with its thermal status, and then read data from the table to control air mover 108 settings based on the power being received by the storage resource 112. Over time, the table may become more populated, allowing for finer control of the setting of air mover 108.

Although the present disclosure has been described in detail, it should be understood that various changes, substitutions, and alterations can be made hereto without departing from the spirit and the scope of the invention as defined by the appended claims.

What is claimed is:

1. A storage enclosure configured to receive at least one storage resource, the storage enclosure comprising:

an air mover configured to cool one or more storage resources received by the storage enclosure by delivering a flow of air within the storage enclosure;
a power supply module configured to generate and deliver electrical energy to information handling resources of the storage enclosure including the at least one storage resource, the power supply module comprising a power monitor configured to:
measure a physical quantity indicative of an electrical current delivered from the power supply module; and
detect an overcurrent condition of the power supply module based on the physical quantity and cause the power supply module to shut down in response to detection of the overcurrent condition; and
a controller configured to:
based on the physical quantity, determine a power delivered from the power supply module;
based on the power delivered from the power supply module, determine a desired rate of the flow of air from the air mover;
cause the air mover to deliver the flow of air in accordance with the desired rate;
calculate an estimated power delivered to the one or more storage resources based on the power delivered from the power supply module;
periodically receive from the one or more storage resources a signal indicative of a thermal status of the one or more storage resources;
responsive to receiving the signal, store to a data structure data correlating the thermal statuses to the estimated power delivered to the one or more storage resources at the time the signal indicative of a thermal status is received; and
determine the desired rate of the flow of air based on the data stored to the data structure in addition to the physical quantity indicative of the power delivered from the power supply module.

2. The storage enclosure of claim 1, further comprising an additional power monitor for measuring a second physical quantity indicative of the power delivered from the power supply module to at least one information handling resource of the storage enclosure other than the one or more storage resources received by the storage enclosure, and wherein the controller is configured to determine the desired rate of the flow of the air based on the second physical quantity in addition to the physical quantity indicative of the power delivered from the power supply module.

3. The storage enclosure of claim 2, wherein the at least one information handling resource of the storage enclosure comprises the controller and the second physical quantity is indicative of the power delivered from the power supply module to the controller.

4. A method comprising:
measuring a physical quantity in order to detect an overcurrent condition of a power supply module, wherein the power supply module is configured to shut down in response to detection of the overcurrent condition;
based on the physical quantity, determining a power delivered from the power supply module;
based on the power delivered from the power supply module, determining a desired rate of a flow of air from at least one air mover configured to cool one or more storage resources received by a storage enclosure by delivering the flow of air within the storage enclosure and causing the at least one air mover to deliver the flow of air in accordance with the desired rate;
calculating an estimated power delivered to the one or more storage resources based on the power delivered from the power supply module;
periodically receiving from the one or more storage resources a signal indicative of a thermal status of the one or more storage resources;
responsive to receiving the signal, storing to a data structure data correlating the thermal statuses to the estimated power delivered to the one or more storage resources at the time the signal indicative of a thermal status is received; and
determining the desired rate of the flow of air based on the data stored to the data structure in addition to the physical quantity.

5. The method of claim 4, further comprising:
receiving an indication of a second physical quantity indicative of the power delivered from the power supply module to at least one information handling resource of the storage enclosure other than the one or more storage resources of the storage enclosure; and
determining the desired rate of the flow of the air based on the second physical quantity in addition to the physical quantity.

6. The method of claim 4, wherein the physical quantity comprises an electrical current delivered from the power supply module.

7. A controller for thermal control of an enclosure comprising one or more storage resources, the controller configured to:
measure a physical quantity in order to detect an overcurrent condition of a power supply module, wherein the power supply module is configured to shut down in response to detection of the overcurrent condition;
based on the physical quantity, determine a power delivered from the power supply module;
based on the power delivered from the power supply module, determine a desired rate of a flow of air from at least one air mover configured to cool one or more storage resources received by the enclosure by delivering the flow of air within the enclosure and causing the at least one air mover to deliver the flow of air in accordance with the desired rate;
calculate an estimated power delivered to the one or more storage resources based on the power delivered from the power supply module;
periodically receive from the one or more storage resources a signal indicative of a thermal status of the one or more storage resources;
responsive to receiving the signal, store to a data structure data correlating the thermal statuses to the estimated power delivered to the one or more storage resources at the time the signal indicative of a thermal status is received; and
determine the desired rate of the flow of air based on the data stored to the data structure in addition to the physical quantity.

8. The controller of claim 7, further configured to:
receive an indication of a second physical quantity indicative of the power delivered from the power supply module to at least one information handling resource of the enclosure other than the one or more storage resources of the enclosure; and
determining the desired rate of the flow of the air based on the second physical quantity in addition to the physical quantity.

9. The controller of claim 8, wherein the at least one information handling resource of the enclosure comprises the controller and the second physical quantity is indicative of the power delivered from the power supply module to the controller.

10. The controller of claim 7, wherein the physical quantity comprises an electrical current delivered from the power supply module.

* * * * *